US008214816B2

(12) United States Patent
Chen et al.

(10) Patent No.: US 8,214,816 B2
(45) Date of Patent: *Jul. 3, 2012

(54) COMPILER IMPLEMENTED SOFTWARE CACHE IN WHICH NON-ALIASED EXPLICITLY FETCHED DATA ARE EXCLUDED

(75) Inventors: Tong Chen, Yorktown Heights, NY (US); John Kevin Patrick O'Brien, South Salem, NY (US); Kathryn O'Brien, South Salem, NY (US); Byoungro So, Santa Clara, CA (US); Zehra N. Sura, Yorktown Heights, NY (US); Tao Zhang, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

This patent is subject to a terminal disclaimer.

(21) Appl. No.: 12/128,194

(22) Filed: May 28, 2008

(65) Prior Publication Data

US 2008/0229291 A1    Sep. 18, 2008

Related U.S. Application Data

(63) Continuation of application No. 11/279,768, filed on Apr. 14, 2006, now Pat. No. 7,784,037.

(51) Int. Cl.
*G06F 9/45* (2006.01)
(52) U.S. Cl. ...................................................... 717/157
(58) Field of Classification Search .................. 717/158, 717/159, 148–157; 711/137, 213, 202; 712/1, 712/226
See application file for complete search history.

(56) References Cited

U.S. PATENT DOCUMENTS

| | | | | |
|---|---|---|---|---|
| 5,704,053 | A | * | 12/1997 | Santhanam .................... 717/158 |
| 5,860,138 | A | * | 1/1999 | Engebretsen et al. ......... 711/202 |
| 7,493,607 | B2 | * | 2/2009 | Moritz ........................... 717/151 |
| 2003/0074653 | A1 | * | 4/2003 | Ju et al. .......................... 717/154 |
| 2004/0010675 | A1 | * | 1/2004 | Moritz ........................... 711/202 |
| 2005/0102486 | A1 | * | 5/2005 | Lakshmanamurthy et al. .. 712/1 |
| 2007/0261042 | A1 | | 11/2007 | Chen et al. |

OTHER PUBLICATIONS

Lin et al, "A Compiler Framework for Speculative Optimizations", ACM Taco Sep. 2004, vol. 1, iss. 3 pp. 1-25.*
Cahoon et al, "Effective Compile-time Analysis for Data Prefetching in Java", Sep. 2002, pp. 1-188 <cahoon-thesis02.pdf>.*
Darnell et al., "Automatic Software Cache Coherence through Vectorization", Proceedings of the ACM International Conference on Supercomputing, Washington, DC, Jul. 1992, 16 pages.
USPTO U.S. Appl. No. 11/279,768, Image File Wrapper printed Jul. 16, 2010, 1 page.

* cited by examiner

*Primary Examiner* — Tuan Anh Vu
(74) *Attorney, Agent, or Firm* — Francis Lammes; Stephen J. Walder, Jr.; Matthew B. Talpis

(57) ABSTRACT

A compiler implemented software cache in which non-aliased explicitly fetched data are excluded are provided. With the mechanisms of the illustrative embodiments, a compiler uses a forward data flow analysis to prove that there is no alias between the cached data and explicitly fetched data. Explicitly fetched data that has no alias in the cached data are excluded from the software cache. Explicitly fetched data that has aliases in the cached data are allowed to be stored in the software cache. In this way, there is no runtime overhead to maintain the correctness of the two copies of data. Moreover, the number of lines of the software cache that must be protected from eviction is decreased. This leads to a decrease in the amount of computation cycles required by the cache miss handler when evicting cache lines during cache miss handling.

19 Claims, 4 Drawing Sheets

COMPILER IMPLEMENTED SOFTWARE CACHE IN WHICH NON-ALIASED EXPLICITLY FETCHED DATA ARE EXCLUDED

This application is a continuation of application Ser. No. 11/279,768, filed Apr. 14, 2006, now issued as U.S. Pat. No. 7,784,037.

BACKGROUND

1. Technical Field

The present application relates generally to an improved data processing system and method. More specifically, the present application is directed to a compiler implemented software cache apparatus and method in which non-aliased explicitly fetched data are excluded from the software cache.

2. Description of Related Art

Shared memory multiprocessor systems are typically composed of a plurality of processors and memories that are linked by an interconnection bus or network. In such shared memory multiprocessor systems, because memory accesses must go through this interconnection bus or network, memory access latency becomes important to the performance of the multiprocessor system. Various approaches have been attempted to minimize this access latency. Such approaches generally involve multithreading techniques and caching techniques.

With particular importance to the present invention, when using caching in a multiprocessor system, the need to maintain cache coherence is an important consideration. That is, in order to avoid changing the semantics of a program execution through the use of caches, the memory must retain the appearance of sequential consistency. Most approaches to this cache coherence problem have focused on hardware mechanisms to maintain coherence. However, the overhead of maintaining coherence in hardware can be high and scaling systems based on hardware coherence can be a difficult problem.

An alternative to hardware-based solutions for coherence is to use compilers to analyze programs and automatically augment them with calls to coherence operations, e.g., updates and invalidates, where necessary. Compiler based coherence techniques require only minimal support from cache hardware. The hardware need only provide a mechanism to enable software control of the cache. Such compiler based coherence techniques that make use of software control of caches are typically referred to as "software caches." More information regarding cache coherence and software cache coherence mechanisms may be found in Darnell et al., "Automatic Software Cache Coherence Through Vectorization," Proceeding of the 1992 International Conference on Supercomputing.

In a program compiled to use a compiler implemented software cache, in addition to using the software cache, there are also opportunities to use explicit fetching of data to avoid the cache lookup overhead costs. That is, the compiler may explicitly fetch data that is used often in a program and place this data in an explicitly fetched data buffer so that this data is made available locally in such a manner that it may be directly accessed without having to perform a software cache lookup operation and without having to re-fetch the data from a system memory and thus, experiencing the associated access latency.

Explicit fetching of data is beneficial for a number of reasons. First, with explicitly fetched data, the compiler can be certain that the entire bundle of data that is explicitly fetched will be utilized by the program. On the other hand, for software cache data, since operations on the software cache must be performed on a cache line by cache line basis, some data in the cache line may not actually be utilized by the program. Thus, larger bundle of data can be accessed together by explicit fetching to reduce the setup overhead for data transfer. Moreover, with software cache data, a cache lookup operation must be performed in order to locate the required data in the software cache and then retrieve the data from the software cache or perform miss handling if the data is not present within the software cache. With explicitly fetched data, no such cache lookup operation is required since the data is known to be present in the explicitly fetched data buffer and specific references to the explicitly fetched data buffer are utilized.

To maintain correctness of the two copies of the original data, i.e. the software cache data and the explicitly fetched data, extra operations must be invoked. For explicit fetching of data, such explicit fetching must be recorded in the associated cache directory, i.e. the addresses of the explicitly fetched data are recorded in a cache directory, so that corresponding cached data may be maintained consistent with the explicitly fetched data. The recording of this address information in the cache directory pertaining to the explicitly fetched data requires additional processor cycles, thereby increasing the execution time of the code.

In addition, when a software cache becomes full and additional data is to be loaded into the software cache, existing data in the software cache must be evicted in order to make space available for the new data. When choosing candidates for eviction from the software cache, the software cache may not evict explicitly fetched data since subsequent instructions may refer to this data without the use of a cache lookup operation. Such a situation may lead to an inconsistency between the explicitly fetched data and the cached data and may lead to errors in the execution of program instructions. Thus, again, when loading data into the software cache, additional processor cycles are required to determine what data may and may not be evicted from the software cache to provide additional space for the new data.

Thus these two constraints on the use of a software cache increase the execution time of program code that uses a combination of software caching and explicitly fetching.

SUMMARY

The illustrative embodiments provide a compiler implemented software cache apparatus and method in which non-aliased explicitly fetched data are excluded from the software cache. With the mechanisms of the illustrative embodiments, a compiler uses a forward data flow analysis to prove that there is no alias between the cached data and explicitly fetched data. Explicitly fetched data that has no alias in the cached data are excluded from the software cache. Explicitly fetched data that has aliases in the cached data are allowed to be stored in the software cache. Such data is not included in the explicitly fetched data set by the compiler and thus, transformations of the source code for such data so as to make it explicitly fetched are not performed.

In this way, there is no runtime overhead to maintain the correctness of the two copies of data, i.e. the explicitly fetched data and the software cache data. This is because there is no intersection of the two copies of data and thus, modifications to one copy of data will not affect the data stored in the other copy of data.

In addition, the mechanisms of the illustrative embodiments reduce the number of lines in the software cache that contain explicitly fetched data. As a result, the number of lines of the software cache that must be protected from eviction is decreased. This leads to a decrease in the amount of computation cycles required by the cache miss handler when determining which lines of the software cache to evict in favor of other data retrieved from the system memory.

In one illustrative embodiment, the mechanisms of the illustrative embodiments are implemented in a heterogeneous multi-processor system-on-a-chip. One example of such a system-on-a-chip is the Cell Broadband Engine (CBE) available from International Business Machines, Inc. of Armonk, N.Y. In such an implementation, the mechanisms may be implemented in a compiler that runs on a control processor and compiles source code for execution on the control processor and one or more co-processors. Portions of the compiled code may be provided to the co-processors by the control processor. These co-processors may make use of software caches for accessing data and/or instructions, during the processing of their portions of the compiled code, from a shared or distributed memory.

In one illustrative embodiment, a method is provided for compiling source code for execution by one or more processors. The method may comprise creating a control flow graph for the source code and generating, for an assignment statement in the source code, a candidate set of data for explicit fetching. The method may further comprise performing a forward data flow analysis of the control flow graph to identify whether the candidate set of data for explicit fetching has aliases in non-explicitly fetchable data. Source code may be compiled such that the candidate set of data for explicit fetching is excluded from being placed in a software cache during runtime if the candidate set of data for explicit fetching has aliases in non-explicitly fetchable data. The generating, performing, and compiling operations may be repeated for each assignment statement in the source code.

The method may further comprise generating, for the assignment statement in the source code, a candidate set of data for storing in a software cache. The candidate set of data for storing in the software cache may be added to a cached reference set if the candidate set of data for explicit fetching does not have an alias in the non-explicitly fetchable data. The source code may be compiled such that the cached reference set is stored in the software cache during runtime. The method may further comprise adding the candidate set of data for explicit fetching to the cached reference set in addition to the candidate set of data for storing in the software cache if the candidate set of data for explicit fetching has aliases in non-explicitly fetchable data.

The compiling of the source code such that the cached reference set is stored in the software cache during runtime may comprise inserting software cache operations into compiled code corresponding to the source code in association with references to data in the cached reference set. The compiling of the source code such that the cached reference set is stored in the software cache during runtime may comprise inserting software cache operations into compiled code corresponding to the source code in association with references to data in the cached reference set. Moreover, compiling the source code such that the candidate set of data for explicit fetching is excluded from being placed in a software cache during runtime may comprise inserting explicitly fetched data buffer references in compiled code corresponding to the source code for data in the candidate set of data for explicit fetching.

The data processing system in which the method is implemented may be a heterogeneous multi-processor system-on-a-chip having a control processor and one or more co-processors. The method may further comprise partitioning compiled code corresponding to the source code into one or more portions of code for execution on the control processor and one or more portions of code for execution on the one or more co-processors. The one or more co-processors may have associated software caches and the method may optimize the source code for use with the software caches of the one or more co-processors.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for compiling source code for execution by one or more processors. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
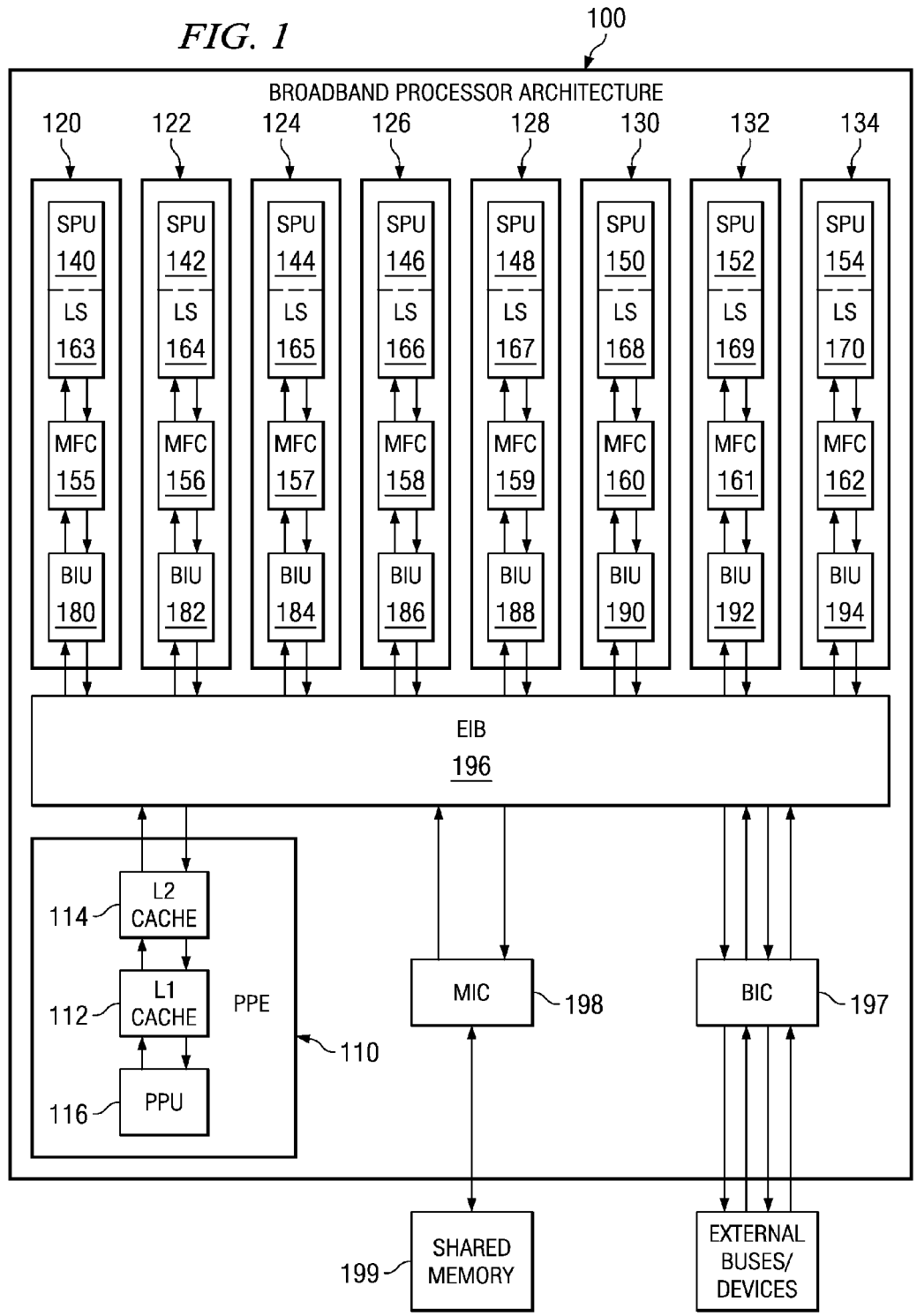
FIG. 1 is an exemplary block diagram of a data processing system in which aspects of the present invention may be implemented.

The illustrative embodiments provide mechanisms for evaluating statements in program code to determine which explicitly fetched data does not have aliases in a software cache and excluding such explicitly fetched data from the software cache. As such, the illustrative embodiments may be implemented in any data processing environment in which software caching is performed. FIG. 1 hereafter is provided as one exemplary data processing environment in which the mechanisms of the illustrative embodiments may be implemented. FIG. 1 is only exemplary and is not intended to state or imply any limitation with regard to the types or configurations of the data processing systems in which the mechanisms of the illustrative embodiments may be implemented. Many modifications to the data processing environment illustrated in FIG. 1 may be made without departing from the spirit and scope of the present invention.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the CBE architecture described above as an exemplary data processing environment, the illustrative embodiments make use of a compiler, which may be executed on the PPE 110, for example, or another platform, to compile source code for execution on the PPE 110 and, optionally, one or more of the SPEs 120-134. As part of the compilation of the source code, the compiler identifies data variables that are explicitly fetchable and data variables that are not. The explicitly fetchable data variables are checked to ensure that they do not have any aliases to non-explicitly fetchable data variables. Those explicitly fetchable data variables that do not have any alias to non-explicitly fetchable data variables are excluded, by the compiler, from being accessed via the software cache of the SPEs 120-134. Those data variables that have aliases are not permitted by the compiler to be explicitly fetched and instead, are accessed via the software cache. In the CBE architecture, the resulting compiled code is partitioned for execution on the PPE 110 and SPEs 120-134. At runtime, the master thread resides on the PPE 110 and threads on the SPEs 120-134 are forked when needed.

In one illustrative embodiment, the SPEs 120-134 make use of software caches to access data stored in the main system memory associated with the PPE 110. This is an example implementation in which the software caches are utilized to access a shared memory. However, it should be appreciated that the same mechanisms of the illustrative embodiments may be utilized in implementations where a distributed memory is accessed via the software cache.

Data required by the SPEs 120-134 may be stored in the software cache of the SPEs 120-134 or may be explicitly fetched using direct memory access (DMA) operations between the main system memory and the local stores of the SPEs 120-134. The basic criteria for explicit fetching of data using DMA operations is that a subscript expression of a reference to a variable data value in the source code is a linear function of the loop index for the loop in which the reference appears. For example, if there is a loop "for i=1 to 10" and within that loop the variable $R_i$ is referenced, then all of the $R_i$ values may be determined by the compiler to be explicitly fetchable since the subscript is known to be 1 to 10. However, if the variable $R_{i+k}$ is referenced within the loop, and k is a variable whose value is defined by a function outside of the loop, the compiler will not know what the value of k is at runtime. As a result, the values for $R_{i+k}$ cannot be explicitly fetchable and must be loaded via the software cache.

The illustrative embodiments identify which of the explicitly fetchable data variables have aliases in the software cache and which do not. Those explicitly fetchable data that do not have aliases in the software cache are identified and excluded from the software cache. In order to "exclude" explicitly fetchable data that do not have aliases in the software cache from the software cache, addresses for the explicitly fetched data are not added by the compiler as entries in the software cache directory. Furthermore, the compiler does not insert explicit software cache lookup operations into the compiled code for these variable references. Rather, the compiler replaces references to the explicitly fetchable data variables with references to an appropriate explicitly fetched data buffer such that the data may be directly retrieved from this buffer using DMA operations.

The illustrative embodiments make use of the compiler to analyze program code to determine, for each explicitly fetchable variable, whether that variable has aliases in the set of non-explicitly fetchable data. As is generally known in the art, aliasing is a term that generally means that a variable or some reference, when changed, has an indirect effect on some other data. One variety of aliasing can occur in any computer programming language that can refer to one location in memory with more than one name, such as by using pointers. The tolerance (or the lack thereof) of code for aliasing must be carefully documented, particularly for functions that perform complex manipulations on memory areas passed to them. Controlled aliasing behavior (that is, aliasing behavior that is specified) may be desirable in some cases. For example, controlled aliasing may allow certain data structures to be modified directly with less code.

With the illustrative embodiments, the compiler analyzes the program code by performing data flow analysis on the control flow graph of the program code. As is generally known in the art, the control flow graph is an abstract data structure representation of a procedure or program that is maintained internally by a compiler. Each node in the control flow graph represents a basic block, i.e. a straight-line piece of code without any jumps or jump targets (jump targets start a block, and jumps end a block). Directed edges are used to represent jumps in the control flow.

The control flow graph is a static representation of the program and represents all alternatives of control flow. Thus, for example, both arms of an IF statement are represented in the control flow graph. Consider the following fragment of code:

```
0: (A) t0 = read_num
1: (A) if t0 mod 2 == 0 goto 4
2: (B)      print t0 + " is odd."
3: (B)      goto 5
4: (C) print t0 + " is even."
5: (D) end program
```

In the above fragment of code, there are 4 basic blocks: block A from lines 0 to 1, block B from lines 2 to 3, block C at line 4, and block D at line 5. In particular, in this case, A is the "entry block", D the "exit block" and lines 4 and 5 are jump targets. A control flow graph for this fragment has edges from A to B, A to C, B to D and C to D.

After having generated a control flow graph of the program code, the compiler of the illustrative embodiments performs data flow analysis on the control flow graph. Data flow analysis is a process to discover the dependencies between different data items manipulated by a program. The order of execution in a data driven language is determined solely by the data dependencies. For example, given the equations:

1. $X = A + B$

2. $B = 2 + 2$

3. $A = 3 + 4$ a data-flow analysis would find that equations 2 and 3 must be evaluated before equation 1. Since there are no data dependencies between 2 and 3, they may be evaluated in any order, including in parallel.

The compiler of the illustrative embodiments uses a forward data flow analysis to step through each statement in the program code and determine whether a candidate set of data for explicit fetching can be actually explicitly fetched with regard to the software cache. As mentioned above, the candidate set of data for explicit fetching may be determined by identifying those data variables, or references, in the program code statements that have subscripts that are a linear function of a loop index, for example.

The forward data flow analysis involves iterating through the control flow graph forwardly and determining, for each node, whether an alias to a candidate set of explicitly fetched data for an assignment statement in the program code is present. If there are no aliases present in any node of the control flow graph, then the candidate set of explicitly fetched data for the assignment statement is not added to the cached set. If there are aliases present in nodes of the control flow graph, then the candidate set of explicitly fetched data for the assignment statement is added to the cached set and the data is not explicitly fetchable. If the statement is a merge of the control flow, then the cached set is the sum of the candidate set for the software cache for each branch of the control flow. If the statement is a cache flush, then the cache set is set to the empty set. This process may be performed for each assignment statement in the program.

Figure 2A:
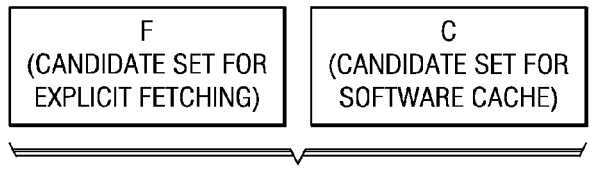
FIGS. 2A-2D illustrate relationships between candidate sets of data in accordance with an illustrative embodiment.

The methodology employed by the compiler when determining which data may be explicitly fetched and which data is to be included in the software cache may be better understood with regard to FIGS. 2A-2D which illustrate relationships between candidate sets of data in accordance with an illustrative embodiment. It should be appreciated that for each assignment statement in a program, there are two sets of data: set F—the candidate set of data for explicit fetching; and set C—the candidate set of data for the software cache. As shown in FIG. 2A, it is required by the mechanisms of the illustrative embodiments that the candidate set for explicit fetching (F) not intersect with the candidate set for the software cache (C), i.e. $F \cap C = \emptyset$. Thus, as shown in FIG. 2A, there is no intersection between sets F and C.

The data flow analysis performed by the compiler of the illustrative embodiments is used to determine whether the candidate set for explicit fetching (F) can be actually explicitly fetched with regard to the software cache. Again, the goal is to identify those portions of data that may be explicitly fetched so that they will not be included in the software cache and thus, the number of lines in the software cache that may not be evicted during cache miss handling may be reduced. Moreover, by assuring that there is no intersection between the candidate set for explicit fetching and the candidate set for the software cache, the extra overhead required for ensuring consistency between these two sets of data may be eliminated.

As part of the data flow analysis, the cached reference set (CS) is computed so as to determine what portions of data may be loaded into the software cache. The cached reference set represents all the possible references in the program code that may be in cache at the current point in execution of the program. At the beginning of the program, the cached set is empty, i.e. $CS = \emptyset$.

The data flow analysis is a forward data flow analysis in which the control flow graph is iterated forwardly. Assume that the cached reference set at the entrance of a statement in the control flow graph is CS. The cached reference set at the exit of the statement will be determined based on whether or not the statement contains an alias reference to the candidate set for explicit fetching (F). Initially, the candidate set for explicit fetching is marked as true, meaning that the candidate set for explicit fetching may be explicitly fetched during program execution.

Figure 2B:
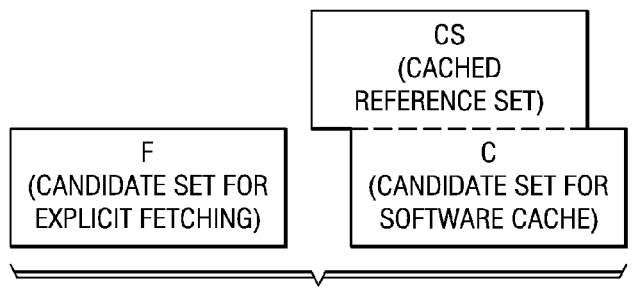

For example, if the candidate set for explicit fetching (F) has no alias in the cached reference set CS, then the cached reference set at the exit of the statement will be the union of the candidate set for the software cache (C) of the assignment statement with the cached reference set at the entrance of the statement, i.e. CS∪C. This is shown in FIG. 2B. In other words, for the assignment statement, the cached reference set is the combination of the cached reference set at the entrance to the statement and the candidate set for the software cache.

Figure 2C:
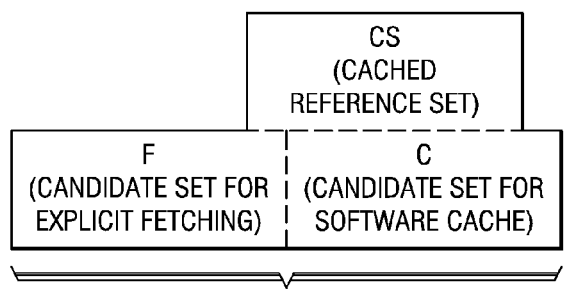

If the candidate set for explicit fetching (F), of the assignment statement, has an alias in the statement, then the cached reference set at the exit of the statement will be the union of the cached reference set at the entrance of the statement (CS) with the candidate set for the software cache (C) and the candidate set for explicit fetching (F). In such a case, the candidate set for explicit fetching (F) will be marked as false, indicating that the candidate set for explicit fetching (F) cannot be explicitly fetched. FIG. 2C illustrates this case. As shown in FIG. 2C, since there is an alias in the program statement, consistency of the explicitly fetched data with the software cache data would be required if explicit fetching of this data is permitted to be performed. Thus, this data is added to the cached reference set and is not permitted, by the compiler, to be explicitly fetched. In other words, where the compiler may normally replace the reference with a reference to a particular buffer in order to perform explicit fetching, such replacement is not made and instead, a software cache lookup instruction may be added for that particular reference.

Figure 2D:
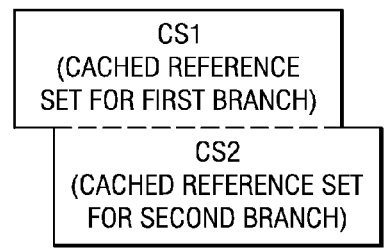

If the statement in the program that is being analyzed by the compiler is a statement that merges the control flow, e.g., the merging of two branches of the control flow graph, then the resulting cached reference set at the exit of the statement is the union of the two cached reference sets for the two branches, i.e. CS1∪CS2 where CS1 is the cached reference set for a first branch and CS2 is the cached reference set for the second branch. This situation is shown in FIG. 2D. Of course, if there are additional branches beyond two, the resulting cached reference set would be the union of all the cached reference sets of all the branches that are merged by the program statement.

If the statement in the program that is being analyzed by the compiler is a cache flush statement, then the resulting cached reference set is the empty set, i.e. CS=Ø. Such a cache flush may be inserted by the compiler or implied by synchronization directives, for example.

Thus, in summary, for each assignment statement, and for each statement in the program, the compiler checks the program statement to determine if the program statement contains any aliases to the candidate set for explicit fetching associated with the assignment statement. If there are aliases, then the candidate set for explicit fetching is indicated as not being explicitly fetchable and is combined with the candidate set for the software cache and the cached reference set to generate a new cached reference set. If there are no aliases, then the new cached reference set is merely the combination of the previous cached reference set and the candidate set for the software cache associated with the assignment statement.

In this way, a set of explicitly fetchable data is identified as the sum of the candidate sets for explicit fetching for each assignment statement. Moreover, the cached reference set represents the data that is accessible via the software cache. The compiler may then make use of these two sets of data to perform transformations on the source code during compilation so as to take advantage of explicit fetching of data values from an explicitly fetched data buffer and to insert appropriate software cache operations in association with data references that are not accessible by way of explicit fetching.

The following is an example to further illustrate the operation of the mechanisms of the illustrative embodiments. Assume a portion of source code is as follows:

```
Foo( ) {
    for(j =0; j<N; j++) {
        a[j] = b[ind[j]];
    }
}
```

Further assume that the initial value of the cached set at the entrance to the procedure foo is {a}. For the assignment, the compiler has chosen "a" and "ind" as the candidates for explicit fetching and "b" as the candidate for the software cache based on their subscript expressions, i.e. both "a" and "ind" have subscripts "j" that are a linear function of the loop index "j". Since "a" is already in the cached set at the entry of this assignment, reference "a" is marked false and will not be explicitly fetched. Since there is no aliased references associated with "ind" in the cached set, the reference to "ind" is still a candidate for explicit fetching. Thus, after this assignment, the cached set is {a, b}. The process may iterate on the flow graph inter-procedurally until no further change happens.

Figure 3:
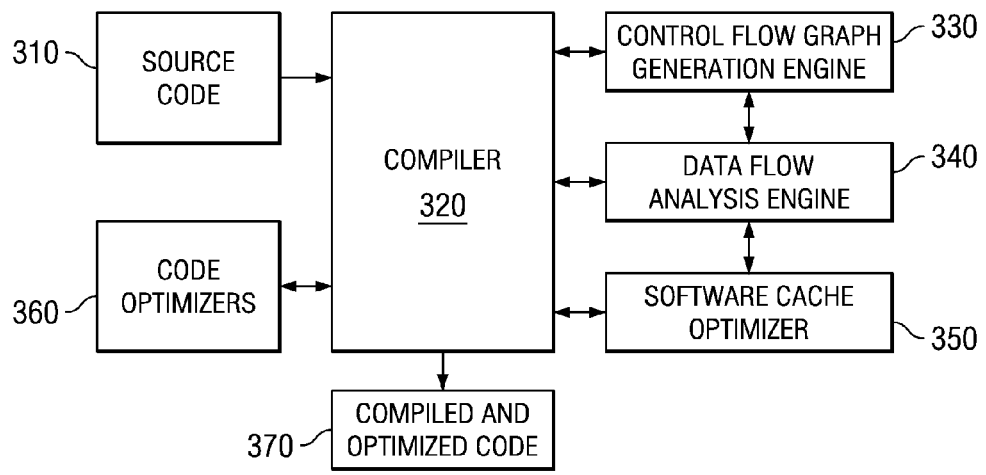
FIG. 3 is an exemplary block diagram illustrating the primary operational elements of a software cache optimization mechanism in accordance with one illustrative embodiment.

FIG. 3 is an exemplary block diagram illustrating the primary operational elements of a software cache optimization mechanism in accordance with one illustrative embodiment. In a preferred illustrative embodiment, the elements shown in FIG. 3 are preferably implemented as software instructions executed by one or more processors. For example, in one illustrative embodiment, the elements shown in FIG. 3 may be implemented as software instructions in the SPEs 120-134 or the PPE 110 of the CBE 100 shown in FIG. 1. However, it should be noted that the elements of FIG. 3 may also be implemented has hardware or any combination of hardware and software without departing from the spirit and scope of the present invention.

As shown in FIG. 3, source code 310 is provided to the compiler 320 which interfaces with, and coordinates the operation of, the control flow graph generation engine 330, the data flow analysis engine 340, the software cache optimizer 350, and the other code optimizers 360 to generate compiled and optimized code 370. In response to receiving the source code 310, the compiler 320, as part of the compilation of the source code, calls the control flow graph generation engine 330 to generate a control flow graph to represent the source code 310 internally in the compiler 320. The generation of such control flow graphs in a compiler is generally known in the art.

The compiler 320 further instructions the data flow analysis engine 340 to perform forward data flow analysis of the control flow graph to identify dependencies between different data items manipulated by the program source code 310. The compiler 320 instructs the software cache optimizer 350 to determine which data may be explicitly fetched and which data is to be provided to the software cache based on the dependencies determined by the data flow analysis of the control flow graph. As mentioned above, such determinations involve iteratively advancing the data flow through the control flow graph in a forward manner and checking each statement to determine if it contains aliases to a candidate set for explicit fetching for the assignment statements in the program code. Based on whether or not an alias is present in the statement, the cached reference set is updated to either include or exclude the candidate set for explicit fetching in the cached reference set for the program code. If the candidate set for explicit fetching is included in the cached reference set, then the candidate set for explicit fetching is marked as not being able to be explicitly fetched.

Based on this information, the compiler may perform a number of transformations such as tiling loops in the source code so that an explicit fetching buffer can fit into the limited local memory, maximize the data re-use of explicitly fetched data by replacing references to explicitly fetchable data with references to an appropriate explicit fetching buffer, insert software cache lookup instructions in association with the data in the cached reference set, and the like, thereby generating software cache optimized code This software cache optimized code may be provided to other code optimizers 360 which may perform other optimizations on the code, as is generally known in the art. The resulting code may be output as the compiled and optimized code 370 which may be executed by appropriate processors of the data processing system to perform useful work.

Figure 4A:
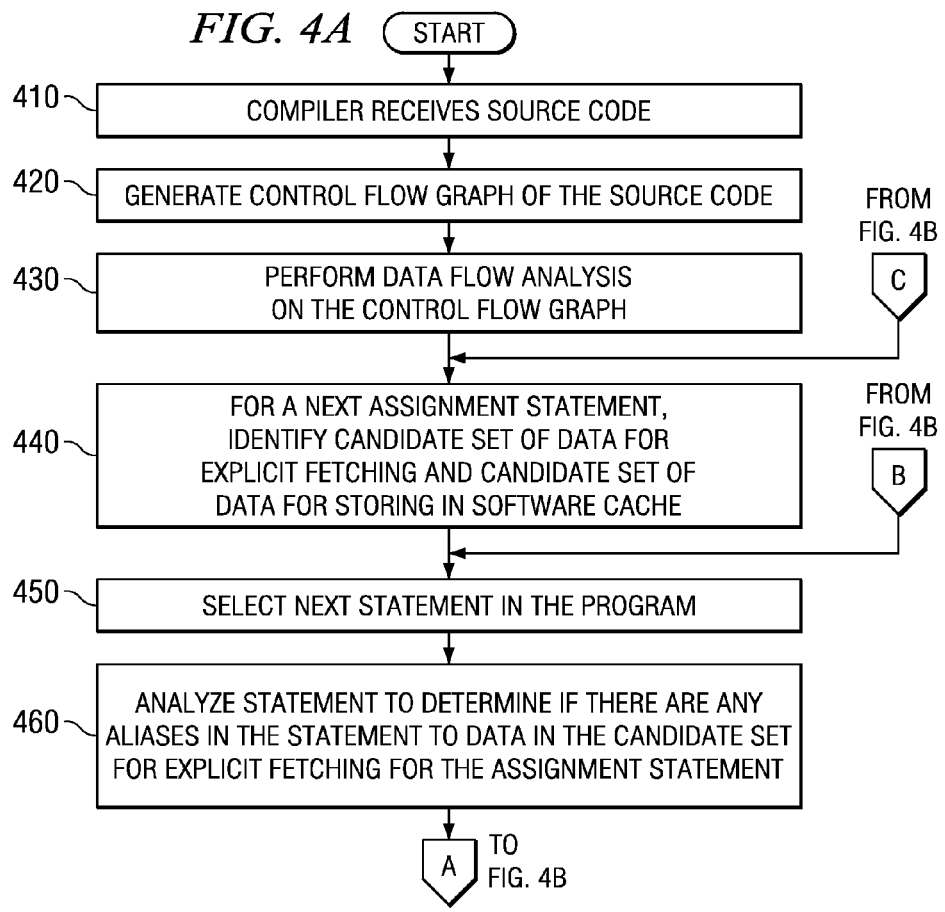
FIGS. 4A and 4B illustrate a flowchart outlining an exemplary operation of a software cache optimization mechanism in accordance with one illustrative embodiment.
Figure 4B:
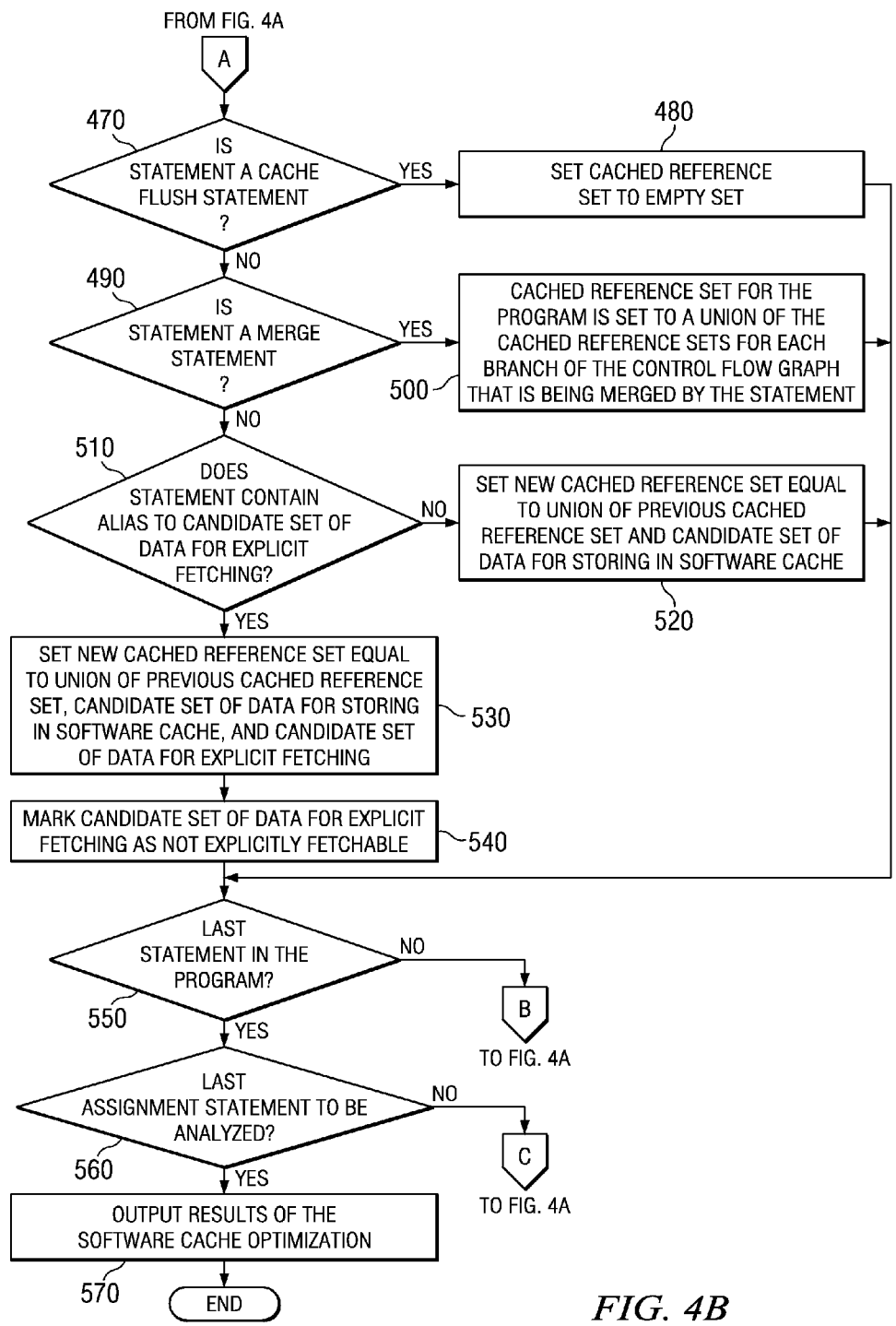

FIGS. 4A and 4B illustrate a flowchart outlining an exemplary operation of a software cache optimization mechanism in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIGS. 4A-4B, the operation starts by the compiler receiving source code (step 410). A control flow graph generation engine then generates a control flow graph of the source code (step 420). A data flow analysis engine 340 performs data flow analysis on the control flow graph (step 430). For a next assignment statement, the software cache optimizer identifies a candidate set of data for explicit fetching and a candidate set of data for storing in the software cache (step 440). The software cache optimizer selects a next statement in the program is selected (step 450) and analyzes the statement to determine if there are any aliases in the statement to data in the candidate set for explicit fetching for the assignment statement (step 460).

The software cache optimizer determines if the statement is a cache flush statement (step 470). If so, then the cached reference set for the program is set to the empty set (step 480) and the operation continues to step 550. If the statement is not a cache flush statement, the software cache optimizer determines if the statement is a statement that merges the control flow (step 490). If so, then the cached reference set for the program is set to a union of the cached reference sets for each branch of the control flow graph that is being merged by the statement (step 500) and the operation continues to step 550.

If the statement is not a cache flush statement or a merge statement, the software cache optimizer determines if the statement contains an alias to the candidate set of data for explicit fetching (step 510). If there are no aliases in the statement, then the new cached reference set is equal to the union of the previous cached reference set and the candidate set of data for storing in the software cache (step 520). If there are aliases in the statement, then the new cached reference set is equal to the union of the previous cached reference set, the candidate set of data for storing in the software cache, and the candidate set of data for explicit fetching (step 530). The candidate set of data for explicit fetching is marked as not explicitly fetchable (step 540).

The software cache optimizer a determination is made as to whether this is the last statement in the program (step 550). If not, the operation returns to step 450. If this is the last statement in the program, a determination is made as to whether this is the last assignment statement to be analyzed (step 560). If not, the operation returns to step 440. Otherwise, the software cache optimizer outputs the results of the software cache optimization (step 570) and operation terminates.

Based on the results of this software cache optimization, the compiler may insert instructions into the compiled code and/or transform references to data variables in order to take advantage of explicitly fetching certain explicitly fetchable data and for performing software cache lookup operations for other non-explicitly fetchable data. As a result, the explicitly fetchable data and the software cache data are kept separate such that consistency between these two sets of data need not be continuously checked. Moreover, the amount of data maintained in the software cache that is not evictable is kept to a minimum. As a result, the amount of processing time that is required to maintain consistency between the software cache and explicitly fetched data is minimized as well as the amount of processing time required to perform cache miss handling.

As described above, it should be appreciated that the illustrative embodiments may take the form of an entirely hardware embodiment, an entirely software embodiment or an embodiment containing both hardware and software elements. In one illustrative embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk - read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method, in a data processing system, for compiling source code for execution by one or more processors, comprising:
    creating a control flow graph for the source code;
    generating a candidate set of data for explicit fetching, wherein the candidate set of data for explicit prefetching includes an assignment statement in the source code that has variable data identified within a same loop of the source code where the assignment statement appears;
    generating a candidate set of data for storing in a software cache, wherein the candidate set of data for storing in the software cache includes an assignment statement that has variable data identified outside the same loop of the source code where the assignment statement appears;
    for every candidate in the candidate set of data for explicit fetching, performing a forward data flow analysis of the control flow graph to identify whether the candidate fails to have an alias in the candidate set of data for storing in the software cache thereby forming an exclusion candidate, wherein the alias is identified as a variable or a reference that has an indirect effect on other data; and
    responsive to identifying the exclusion candidate, compiling the source code thereby forming compiled code such that the exclusion candidate is excluded from being placed in a software cache during runtime, wherein excluding the exclusion candidate includes not adding the exclusion candidate to a software cache directory and not inserting software cache operations into the compiled code corresponding to the source code in association with reference to data for the exclusion candidate.

2. The method of claim 1, further comprising:
    adding the candidate set of data for storing in the software cache to a cached reference set if the candidate has an alias in the candidate set of data for storing in the software cache; and
    compiling the source code such that the cached reference set is stored in the software cache during runtime.

3. The method of claim 2, wherein compiling the source code such that the cached reference set is stored in the software cache during runtime comprises inserting software cache operations into the compiled code corresponding to the source code in association with references to data in the cached reference set.

4. The method of claim 1, further comprising repeating the generating, performing, and compiling operations for each assignment statement in the source code.

5. The method of claim 1, wherein compiling the source code such that the exclusion candidate is excluded from being placed in a software cache during runtime comprises inserting explicitly fetched data buffer references in compiled code corresponding to the source code for the exclusion candidate, wherein the explicitly fetched data buffer references are direct memory access operations.

6. The method of claim 1, wherein the data processing system is a heterogeneous multi-processor system-on-a-chip having a control processor and one or more co-processors.

7. The method of claim 6, further comprising:
    partitioning compiled code corresponding to the source code into one or more portions of code for execution on the control processor and one or more portions of code for execution on the one or more co-processors.

8. The method of claim 7, wherein the one or more co-processors have associated software caches, and wherein the method optimizes the source code for use with the software caches of the one or more co-processors.

9. A computer program product comprising a computer useable medium having a computer readable program recorded thereon, wherein the computer readable program, when executed on a computing device, causes the computing device to:
    create a control flow graph for the source code;
    generate a candidate set of data for explicit fetching, wherein the candidate set of data for explicit prefetching includes an assignment statement in the source code that has variable data identified within a same loop of the source code where the assignment statement appears;
    generate a candidate set of data for storing in a software cache, wherein the candidate set of data for storing in the software cache includes an assignment statement that has variable data identified outside the same loop of the source code where the assignment statement appears;
    for every candidate in the candidate set of data for explicit fetching, perform a forward data flow analysis of the control flow graph to identify whether the candidate fails to have an alias in the candidate set of data for storing in the software cache thereby forming an exclusion candidate, wherein the alias is identified as a variable or a reference that has an indirect effect on other data; and
    responsive to identifying the exclusion candidate, compile the source code thereby forming compiled code such that the exclusion candidate is excluded from being placed in a software cache during runtime, wherein excluding the exclusion candidate includes not adding the exclusion candidate to a software cache directory and not inserting software cache operations into the compiled code corresponding to the source code in association with reference to data for the exclusion candidate.

10. The computer program product of claim 9, wherein the computer readable program further causes the computing device to:
    add the candidate set of data for storing in the software cache to a cached reference set if the candidate has an alias in the candidate set of data for storing in the software cache; and
    compile the source code such that the cached reference set is stored in the software cache during runtime.

11. The computer program product of claim 10, wherein the computer readable program causes the computing device to compile the source code such that the cached reference set is stored in the software cache during runtime by inserting software cache operations into the compiled code corresponding to the source code in association with references to data in the cached reference set.

12. The computer program product of claim 9, wherein the computer readable program further causes the computing device to repeat the generate, perform, and compile operations for each assignment statement in the source code.

13. The computer program product of claim 9, wherein the computer readable program causes the computing device to compile the source code such that the exclusion candidate is excluded from being placed in a software cache during runtime comprises inserting explicitly fetched data buffer references in compiled code corresponding to the source code for the exclusion candidate, wherein the explicitly fetched data buffer references are direct memory access operations.

14. The computer program product of claim 9, wherein:
    the computing device is a heterogeneous multi-processor system-on-a-chip having a control processor and one or more co-processors,
    the one or more co-processors have associated software caches, and
    the computer readable program optimizes the source code for use with the software caches of the one or more co-processors.

15. An apparatus for compiling source code for execution by one or more processors, comprising
    a processor; and
    a memory coupled to the processor, wherein the memory comprises instructions which, when executed by the processor, cause the processor to: create a control flow graph for the source code;
    generate a candidate set of data for explicit fetching, wherein the candidate set of data for explicit prefetching includes an assignment statement in the source code that has variable data identified within a same loop of the source code where the assignment statement appears;
    generate a candidate set of data for storing in a software cache, wherein the candidate set of data for storing in the software cache includes an assignment statement that has variable data identified outside the same loop of the source code where the assignment statement appears;
    for every candidate in the candidate set of data for explicit fetching, perform a forward data flow analysis of the control flow graph to identify whether the candidate fails to have in alias in the candidate set of data for storing in the software cache thereby forming an exclusion candidate, wherein the alias is identified as a variable or a reference that has an indirect effect on other data; and
    responsive to identifying the exclusion candidate, compile the source code thereby forming compiled code such that the exclusion candidate is excluded from being placed in a software cache during runtime, wherein excluding the exclusion candidate includes not adding the exclusion candidate to a software cache directory and not inserting software cache operations into the compiled code corresponding to the source code in association with reference to data for the exclusion candidate.

16. The apparatus of claim 15, wherein the instructions further cause the processor to:
    add the candidate set of data for storing in the software cache to a cached reference set if the candidate has an alias in the candidate set of data for storing in the software cache; and
    compile the source code such that the cached reference set is stored in the software cache during runtime.

17. The apparatus of claim 16, wherein the instructions cause the processor to compile the source code such that the cached reference set is stored in the software cache during runtime by inserting software cache operations into the compiled code corresponding to the source code in association with references to data in the cached reference set.

18. The apparatus of claim 15, wherein the instructions further cause the computing device to repeat the generate, perform, and compile operations for each assignment statement in the source code.

19. The apparatus of claim 15, wherein the instructions cause the processor to compile the source code such that the exclusion candidate is excluded from being placed in a software cache during runtime comprises inserting explicitly fetched data buffer references in compiled code corresponding to the source code for the exclusion candidate, wherein the explicitly fetched data buffer references are direct memory access operations.

* * * * *